US012757836B2

(12) United States Patent
Horstmann

(10) Patent No.: US 12,757,836 B2
(45) Date of Patent: Oct. 13, 2026

(54) METHOD FOR OPERATING A COUPLED UNIT

(71) Applicant: MASCHINENFABRIK BERNARD KRONE GMBH & CO. KG, Spelle (DE)

(72) Inventor: Josef Horstmann, Ibbenbueren (DE)

(73) Assignee: MASCHINENFABRIK BERNARD KRONE GMBH & CO. KG, Spelle (DE)

( * ) Notice: Subject to any disclaimer, the term of this patent is extended or adjusted under 35 U.S.C. 154(b) by 236 days.

(21) Appl. No.: 18/673,371

(22) Filed: May 24, 2024

(65) Prior Publication Data

US 2024/0389515 A1 Nov. 28, 2024

(30) Foreign Application Priority Data

May 26, 2023 (DE) ..................... 10 2023 113 953.3

(51) Int. Cl.
*A01F 15/10* (2006.01)
*A01B 63/00* (2006.01)

(52) U.S. Cl.
CPC .......... *A01F 15/106* (2013.01); *A01B 63/004* (2013.01)

(58) Field of Classification Search
CPC .. A01F 15/0825; A01F 15/0833; A01F 15/10; A01F 15/106; A01B 63/004; A01B 63/14; A01D 43/02; A01D 84/00; A01D 78/10; A01D 57/20
See application file for complete search history.

(56) References Cited

U.S. PATENT DOCUMENTS

| | | | | | |
|---|---|---|---|---|---|
| 4,433,533 | A * | 2/1984 | Giani | A01B 69/003 | 56/341 |
| 4,651,512 | A * | 3/1987 | van der Lely | A01F 15/0705 | 100/88 |
| 4,702,066 | A * | 10/1987 | Newendorp | A01F 15/0833 | 100/88 |
| 6,164,051 | A | 12/2000 | Lely et al. | | |
| 10,561,068 | B2 * | 2/2020 | Peden | A01D 78/001 | |
| 2013/0074465 | A1 | 3/2013 | Ardison et al. | | |
| 2015/0059308 | A1 | 3/2015 | Roux | | |

FOREIGN PATENT DOCUMENTS

| | | | |
|---|---|---|---|
| DE | 697 16 234 | T2 | 9/1998 |
| FR | 2 769 462 | A1 | 4/1999 |

OTHER PUBLICATIONS

English translation of FR 2769462 A1, 6 pages. (Year: 2026).*

* cited by examiner

*Primary Examiner* — Jimmy T Nguyen
(74) *Attorney, Agent, or Firm* — Norman B. Thot

(57) ABSTRACT

A method for operating a coupled unit with a swather attached to a tractor, and a round baler attached to the swather. The method includes using the swather to pick up a crop and to deposit the picked-up crop in a deposit area to form a swath with a swath center, using the round baler to pick up the swath via a pick-up device and to further compress the picked-up swath into a crop bale, and performing an automatic pick-up adjustment via a device adjustment on the swather and/or the round bailer via an actuator-based device setting, at which automatic pick-up adjustment a relative picking up position taken at the swath center and at the pick-up device relative to one another with respect to a round baler transverse axis is adjusted so as to achieve a uniform build-up of the crop bale.

13 Claims, 6 Drawing Sheets

METHOD FOR OPERATING A COUPLED UNIT

CROSS REFERENCE TO PRIOR APPLICATIONS

Priority is claimed to German Patent Application No. DE 10 2023 113 953.3, filed May 26, 2023. The entire disclosure of said application is incorporated by reference herein.

FIELD

The present invention relates to a method for operating a coupled unit and to a control device for a coupled unit.

BACKGROUND

Crops such as grass are usually harvested and processed in several stages. The crop is first mowed with a mowing machine, after which it is either simply left lying around or, for example, spread and/or turned over in the field for better drying. At a later stage, possibly when the crop has dried, the grass can be picked up and processed into crop bales. This is performed in two steps. The crop distributed on the field is first gathered into a swath using a swather. Common swathers, such as rotary rakes, are typically pulled by a tractor, which also provides the drive power for the swather's processing elements, for example, via a PTO shaft. The tractor's route thereby determines the course of the resulting swath. A baler, for example, a round baler, is then used to pick up and compress the crop. Such balers can be self-propelled or pulled by a tractor. The tractor can in turn provide the drive power for the feeding, pressing, and binding elements of the round baler. In the classic process sequence, the field must therefore be driven over three times. While a time interval between mowing and swathing often makes sense in order to allow the crop to dry in the meantime, swathing and baling can always follow immediately after each other.

To save time, it has previously been suggested that the baler and the swather be combined in one work train so that the tractor pulls the swather, and the round baler is attached to the swather. This concept causes problems, however, with round balers. The structure of the bale within the bale chamber depends on the distribution of the harvested crop, whereby an uneven distribution also leads to an unevenly shaped bale. In practice, for example, the swath is always thicker towards the center than towards the sides. A part of the bale to which the crop is fed from the center of the swath will therefore grow faster than other parts. Other possible irregularities within the crop also have an effect on the bale structure. In order to obtain a cylindrical round bale that is as evenly shaped as possible, the round baler must occasionally approach the swath with different lateral offsets, i.e., sometimes further to the right and sometimes further to the left. If the round baler is simply attached to the tractor, its position relative to the swath can be adjusted by moving the tractor laterally offset to the center of the swath. If the round baler is connected to the tractor via an intermediate swather, however, a change in the tractor's track automatically affects the swather's track and thus the placement of the swath. A change in the tractor's track is transferred to the swather and the round baler with a delay and, after a short time, the round baler picks up the swath in the middle again, as the swather and round baler again follow the tractor's track. It is therefore not possible to pick up the swath off-center over a longer distance, which may be necessary to balance the bale structure.

SUMMARY

An aspect of the present invention is to combine swath formation and further processing of harvested crop into round bales so that the most uniform possible bale shape is achieved with high efficiency.

In an embodiment, the present invention provides a method for operating a coupled unit with a tractor, a swather attached to the tractor as a first processing device, and a round baler attached to the swather as a second processing device. The method includes using the swather to pick up a crop lying on the ground via processing elements which are arranged on a swather frame, using the swather to deposit the picked-up crop in a deposit area so as to form a swath which has a swath center, using the round baler to pick up the swath via a pick-up device which extends along a round baler transverse axis, using the round baler to further compress the picked-up swath into at least one crop bale, and performing an automatic pick-up adjustment via a device adjustment on at least one of the swather and on the round baler via an actuator-based device setting, at which automatic pick-up adjustment a relative picking up position taken at the swath center and at the pick-up device relative to one another with respect to the round baler transverse axis is adjusted so as to achieve a uniform build-up of the at least one crop bale along the round baler transverse axis.

BRIEF DESCRIPTION OF THE DRAWINGS

The present invention is described in greater detail below on the basis of embodiments and of the drawings in which.

DETAILED DESCRIPTION

Figure 1:
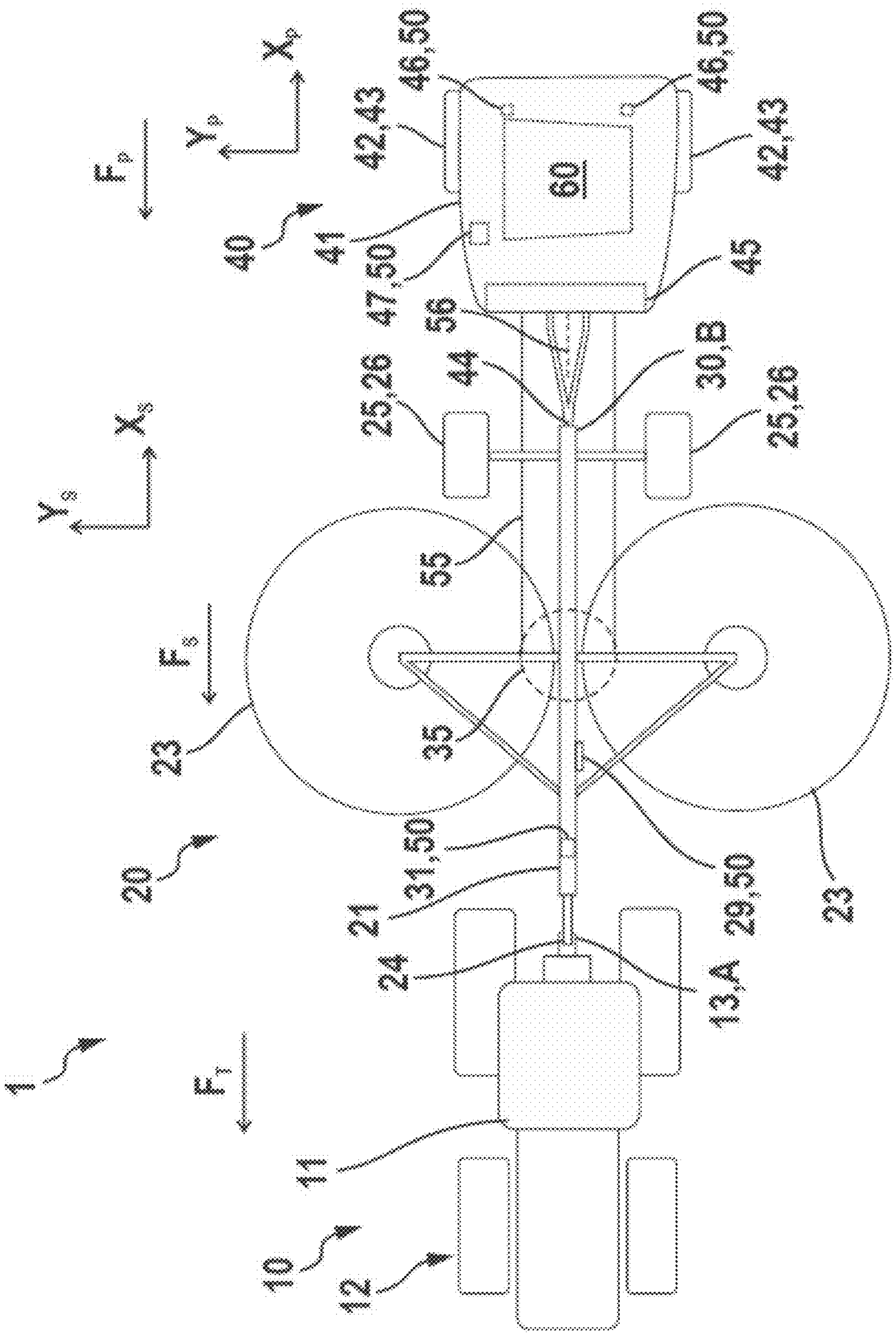
FIG. 1 shows a top view of a coupled unit with a tractor, a swather, and a round baler for carrying out a first embodiment of the method according to the present invention in a first position.

The present invention provides a method for operating a coupled unit with a tractor, a swather attached thereto as the first processing device, and a round baler attached to the swather as the second processing device, wherein the swather picks up crop lying on the ground via processing members which are arranged on a swather frame and deposits the crop in a depositing area, whereby a swath is formed which has a swath center, and wherein the swath is picked up by the round baler with a pick-up device extending along a baler transverse axis, and is subsequently pressed into crop bales.

The coupled unit has at least three vehicles, namely the tractor, the swather, and the round baler. The tractor, which can also be referred to as a tug or tractor unit, is, however, always self-propelled, i.e., equipped with its own traction drive and designed to pull a processing device, in this case the swather. The swather normally does not have its own drive, in particular no own traction drive. In the present method, the swather is pulled by the tractor and is attached thereto. The round baler is in turn attached to the swather, which is therefore also indirectly pulled by the tractor. It also does not normally have its own drive. A swather suspension point can, for example, be formed on the tractor, via which the swather is movably connected to the tractor, i.e., the swather can change its alignment to the tractor when cornering, for example, by pivoting around the swather suspension point. A baler suspension point can, for example, accordingly be formed on the swather via which the round baler is movably connected to the swather. The respective suspension point can be defined by a trailer coupling, for example, a ball head coupling. The swather forms a first processing device, and the round baler forms a second processing device, whereby the designations “first” and “second” indicate the sequence within the coupled unit and are otherwise not to be interpreted restrictively.

The swather picks up crops lying on the ground, in particular stalks such as grass or hay, via processing elements arranged on a swather frame. The processing elements are the parts of the swather that actively interact with the crop. They can, for example, be arranged movably on the swather frame and can in particular be driven. The drive power can, for example, be transmitted by the tractor, for example, via a PTO shaft. The processing elements move the previously collected crop and then deposit the crop in a deposit area. In this context, the depositing area is defined in relation to the processing elements, i.e., when the swather moves across the field, the deposit area also moves. The corresponding movement creates an elongated swath in which the crop is folded or piled up. The swath has a swath center that is arranged centrally between its lateral edges. The swath can have the greatest thickness in the center of the swath, while becoming thinner towards the edges.

The swath is picked up by the round baler with a pick-up device extending along a transverse baler axis and is then pressed into crop bales. The round baler following the swather is guided over the swath and gradually picks it up. This includes the possibility that part of the swath may not be picked up at times, although this is undesirable and is advantageously avoided. The picking up takes place with a device for picking up, for example, a pick-up, which extends along a transverse axis of the baler. The transverse axis of the baler is the transverse axis of the round baler. As in the case of a pick-up, the picking up device can be elongated in the direction of the transverse axis and can be rotatable about the transverse axis, although this is not essential to the present invention. The picked-up crop can be guided to a bale chamber by a conveyor device such as a conveyor rotor or cutting rotor. The actual bale formation takes place in the bale chamber, in which the harvested crop is formed into bales and pressed. The design of the bale chamber is also not essential to the present invention. The bale chamber can be a pressing chamber with a fixed size or with a variable size. Different types of pressing elements can act on the crop, for example, pressing rollers, at least one pressing belt, or a bar chain conveyor. The finished crop bale is also bound inside the round baler and can then be ejected.

According to the present invention, an automatic pick-up adjustment is performed by an actuator-based device setting on at least one of the processing devices, in which a pick-up relative position assumed by the swath center and the pick-up device relative to each other with respect to the baler transverse axis is adjusted in order to achieve a uniform build-up of the crop bale along the baler transverse axis. The relative pick-up position of the swath center and the pick-up device in relation to the baler’s transverse axis describes whether the swath is approached to the left, center, or right when viewed in the direction of travel. It can also be said that the pick-up relative position describes whether the swath center is aligned with the center of the pick-up device or offset to the side. The pick-up adjustment takes place automatically without the intervention of a user, such as the tractor driver. The term “adjustment” refers to a targeted change but should not be interpreted to mean that a specific relative pick-up position can be set exactly. The pick-up adjustment is made in order to achieve a uniform build-up of the crop bale along the baler’s transverse axis. That means, an attempt is made to produce a crop bale that is as uniform as possible along the transverse axis of the baler, i.e., that has a diameter that is as constant as possible. It is understood in this context that an exactly constant diameter cannot be achieved due simply to the uneven quantity and quality of the harvested crop. The method is in any case geared towards the goal of a crop bale that is as uniformly shaped as possible. The method can in particular include a control system that counteracts an interim uneven build-up of the crop bale. For example, if it is determined that the crop bale has a larger diameter on a first side than on an opposite second side, the relative pick-up position is changed so that more crop is fed to the second side.

The pick-up adjustment is carried out by an device adjustment on at least one processing device, i.e., on the swather and/or on the round baler. The respective processing device therefore has at least one actuator that is automatically controlled and causes an adjustable element of the processing device to be adjusted. In the case of the swather, the adjustable element can be adjustable relative to the swather frame. In the case of the round baler, it can be adjustable relative to a baler frame of the round baler. The adjustment does not in any case take place in the area of the tractor, for example, by the tractor carrying out steering movements, but on a processing device. This is based on the knowledge that a steering movement of the tractor can only cause an interim change in the position of the swather and round baler and therefore only an interim change in the relative position of the pick-up. As soon as the tractor drives straight ahead again, the processing devices again follow its track after a short time and are thus arranged in relation to each other as they were before the steering maneuver. On the contrary, it is possible to achieve a change in the pick-up relative position that is maintained in the medium or long term by adjusting the device on a processing device. This means that the round baler can, for example, approach the swath from the left over a distance of 10 m or 20 m in order to feed more crop to the right-hand side of the crop bale.

Various device setting options are described below. These can be used individually, but a combination of two or more device settings is also expressly conceivable.

Different types of swathers can in principle be used in the method according to the present invention, for example, star wheel rakes, comb rakes, belt rakes or the like. The swather can, for example, be designed as a rotary rake with at least two raking rotors, which pick up the crop and deposit it in a depositing area arranged at least partially between them. The basic structure and mode of operation of a rotary rake are known and are therefore not here discussed in detail. The raking rotors form the processing elements that interact with the crop via a plurality of tine arms. Two raking rotors, which are driven in opposite directions, deposit the crop in a deposit area, which is at least partially arranged between them, whereby it can also be partially arranged in the area of one of the raking rotors. In a two-rotor swather, exactly two raking rotors are provided, however, within the scope of the present invention, four-rotor swathers or six-rotor swathers could, for example, also be used in which the additional pairs of rotors pick up crop that is further away from the placement area and transport the crop into the effective area of the innermost pair of rotors.

A current shape of the crop bale can, for example, be detected by sensors within the round baler and the pick-up adjustment is then made depending on the detected shape. Sensory detection of the current shape of the crop bale generally does not mean that all details of the shape are detected. It may be sufficient, for example, to know whether the current diameter on one side of the bale is (significantly) larger than on the opposite side. The shape can be detected, for example, using non-contact sensors, pressure sensors, or position sensors. The relative positions of the picking up are adjusted depending on the detected shape. If, in the above example, the diameter on one side of the bale (e.g., the left) is larger, the pick-up device is shifted relative to the swath in the direction of this side (i.e., to the left), whereby more crop is fed to the other side (i.e., the right side). It should be noted that a picking up adjustment can also take place at times regardless of the detected shape. If the swath is picked up exactly in the middle, for example, after a while the bale will be symmetrical along the transverse axis, but thicker in the middle than on the sides, i.e., barrel shaped. Since such a structure could not be detected by comparing the diameters on the left and right sides, a kind of spontaneous picking up adjustment could also be performed in this case.

Alternatively or additionally, a current swath shape of the swath can be detected by sensors and the pick-up adjustment can be made depending on the detected swath shape. The swath shape can, for example, be detected downstream of the raking rotors and upstream of the pick-up device via an image capture.

One embodiment of the method of the present invention provides for a device adjustment to be carried out on the swather. The intake adjustment can in particular be performed exclusively by adjusting the device on the swather. A round baler can in this case be used which need not be specially designed in any way with regard to the actuators. If special actuators are required to carry out the process, these can be arranged exclusively on the swather. In this embodiment, at least one element of the swather can be adjusted actuator-wise in relation to the swather frame.

It is advantageous for the round baler to send an adjustment signal to the swather, whereupon the swather makes the device adjustment. This can be particularly useful in combination with the above-mentioned embodiment, in which the current shape of the bale is detected by sensors within the round baler. The round baler in any case determines how the device setting on the swather is to be made. The corresponding determination can be made by a control unit or computer unit (e.g., a job computer) of the round baler. A control signal is generated and sent to the swather. On the swather side, the control signal only needs to be received and then executed. It can be received by a control unit (e.g., also a job computer) of the swather, which then controls an actuator of the swather. The logic on which the pick-up adjustment is based is therefore fully implemented on the round baler side. The control signal can in general be an analog signal but is normally a digital signal. The term “transmit” generally refers to both wireless and wired transmissions. Since the swather and the round baler are mechanically coupled to each other anyway for tractive force transmission, the control signal can in particular be transmitted by wire. The swather and the round baler can in particular be connected via an ISOBUS, via which the round baler sends the control signal (digitally) to the swather.

In an embodiment of the present invention, the device setting at least temporarily displaces the deposit area at an angle to a current tractor driving direction of the tractor. Here and in the following, a displacement “at an angle” to a direction always means that the displacement is not parallel to this direction and is therefore at least partially transverse to this direction. The tractor direction of travel corresponds to the direction in which the tractor is traveling at a particular time. This may at times coincide with the direction of travel of one or both processing devices. If the position of the depositing area is shifted at an angle to the tractor’s direction of travel, this influences whether the crop is deposited more to the right, the left, or the center. This means that the course of the swath can be shifted to one side or the other even if the tractor is only driving straight ahead. The shift can also be made proportionally in the direction of the tractor’s travel, although this normally has no influence on the relative pick-up position.

In an embodiment of the present invention, the device setting of at least one steerable axle of the swather influences an alignment of the swather frame relative to the tractor’s direction of travel in order to adjust the relative pick-up position. The swather therefore has at least one steerable axle. Exactly one steerable axle can in particular be provided, which can simultaneously form the only axle of the swather. The swather frame is at least partially supported by the wheels of the steerable axle. The axle is steerable, i.e., the alignment of the wheels of the axle in relation to the swather frame can be adjusted. Axle steering can, for example, be provided. The axle can be steered by an actuator, i.e., the alignment of the axle can be adjusted using at least one actuator. The setting of the axle, i.e., the steering direction, influences the alignment of the swather frame relative to the tractor’s direction of travel. If the axle is set to straight-ahead travel, the swather frame (or a longitudinal axis thereof) is aligned parallel to the tractor’s direction of travel, at least when the tractor is traveling straight ahead for a longer period of time. If the axle is deflected, the swather swerves in relation to the tractor and can follow the tractor in crab steering mode after a while. The wheels of the steerable axle are again aligned parallel to the tractor’s direction of travel, but the swather frame is arranged at an angle to the tractor’s direction of travel. It goes without saying that the deflection of the swather frame generally also results in a shift of the delivery area.

The device setting can, for example, cause a baler suspension point, via which the round baler is connected to the swather, to be displaced at an angle to the tractor’s direction of travel, at least temporarily. The baler suspension point can be defined by a trailer coupling as explained above. In this embodiment, the baler suspension point is displaced relative to the delivery area at an angle to the tractor’s direction of travel, i.e., at least partially transverse to the tractor’s direction of travel. As the round baler is pulled over the baler suspension point, the round baler will also be arranged according to the position thereof, at least when driving straight ahead for a longer period of time. This also changes the position of the round baler and, in particular, that of the pick-up device relative to the delivery area. This in turn influences the relative pick-up position. The displacement of the baler suspension point can be achieved, for example, by steering the swather. If the alignment of the swather frame changes in relation to the tractor's direction of travel, the delivery area can, for example, move less transversely to the tractor's direction of travel than the suspension point. This is in particular the case if the delivery area is located closer to the above-mentioned swather suspension point than the baler suspension point. This changes the position of the delivery area relative to the swather suspension point. This means that the delivery area and the swather suspension point are offset from each other to different degrees transverse to the tractor's direction of travel depending on the alignment of the swather frame.

Instead of the steering of the swather described above, in which its overall alignment is changed, individual elements can also be adjusted in relation to the swather frame. In one embodiment, the device setting is used to adjust the arrangement of the swather's processing elements in relation to the swather frame in order to shift the delivery area. This means that the processing elements can be adjusted so that the position of the delivery area relative to the frame changes. In the case of a rotary rake, it is known in the prior art to arrange the raking rotors closer together or further apart in order to influence the width of the swath, i.e., the raking rotors are adjusted in opposite directions with respect to the transverse axis of the swather (i.e., one raking rotor to the left and the other to the right). This does not change the position of the swath center relative to the swather frame. In this embodiment, however, it is provided that the raking rotors can be adjusted in the same direction (i.e., both to the left or both to the right), whereby the swath center is displaced relative to the swather frame. It is of course also possible to change the width of the swath. Due to the lateral displacement of the delivery area relative to the swather frame, the swath also shifts and there is a change in the relative pick-up position. In this embodiment, for example, when driving straight ahead, the entire coupled unit can maintain its direction of travel and arrangement in relation to each other and the relative pick-up position is only influenced by a different placement of the swath.

The device setting advantageously deflects the round baler at least temporarily at an angle to the current direction of travel of the swather. Since the direction of travel of the swather determines the (local) alignment of the swath, a change in the position of the round baler at an angle to the direction of travel of the swather also means a change in position relative to the swath. As explained above, the position of the round baler can also change when steering the swather due to the displacement of the baler suspension point. This often means not only a change in position at an angle to the direction of travel of the tractor, but also at an angle to the direction of travel of the swather. As will be explained below, there are other options in addition to steering the swather.

Another option is to adjust the position of the baler suspension point relative to the swather frame using an actuator to deflect the round baler. The baler suspension point is therefore not stationary on the swather frame, but its position can be adjusted by an actuator. Adjustment can, for example, be possible along the swather's transverse axis. Moving the baler suspension point results in a change in the position of the round baler which is pulled over the baler suspension point.

The overall design of the swather may be simpler than that of the round baler, making it easier to integrate additional adjustable elements into the swather. It is, however, also possible for an device adjustment to be made on the round baler. This means that the round baler has at least one actuator that can be used to adjust an element of the round baler, for example, in relation to a baler frame. The relative position of the picking up can be influenced by the adjustment.

One possibility is that the round baler is deflected by a device setting of at least one steerable axle of the round baler. The round baler therefore has at least one steerable axle. Exactly one steerable axle can in particular be provided which can simultaneously form the only axle of the round baler. The baler frame is at least partially supported by the wheels of the steerable axle. The axle is steerable, i.e., the alignment of the wheels of the axle in relation to the baler frame can be adjusted. In this case, a steering knuckle can, for example, also be provided. The axle can be steered by an actuator, i.e., the alignment of the axle can be adjusted using at least one actuator. The setting of the axle, i.e., the steering direction, influences the alignment of the baler frame relative to the direction of travel of the swather. If the axle is set to straight-ahead travel, the baler frame (or a longitudinal axis thereof) is aligned parallel to the direction of travel of the swather, at least for longer straight-ahead travel. If the axle is deflected, the round baler swings out in relation to the swather and can follow the swather in crab steering after a while, with the wheels of the steerable axle again being aligned parallel to the direction of travel of the swather. The displacement of the round baler also changes the position of the pick-up device in relation to the swath and thus the relative pick-up position.

The present invention also provides a control device. The control device is provided for a coupled unit having a tractor, a swather attached thereto as the first processing device and a round baler attached to the swather as the second processing device, wherein the swather is provided for picking up crop lying on the ground via processing members which are arranged on a swather frame and depositing it in a deposit area, whereby a swath is formed which has a swath center, and wherein the round baler is provided for picking up the swath with a pick-up device extending along a baler transverse axis and subsequently pressing it into crop bales.

The present invention provides that the control device is set up to carry out an automatic pick-up adjustment via an actuator device setting on at least one of the processing devices, in which a pick-up relative position assumed by the swath center and pick-up device relative to each other with respect to the baler transverse axis is adjusted in order to achieve a uniform build-up of the crop bale along the baler transverse axis.

The control device can be arranged at least partially on the swather and/or on the round baler. It can have a swather control unit and/or a baler control unit. The baler control unit can be set up to send a control signal to the swather control unit. The respective control unit can be set up to control an actuator by which the device setting is made. Each of the control units and thus also the control device as a whole can be partially implemented in software. Advantageous embodiments of the field processing arrangement according to the present invention correspond to those of the method according to the present invention.

The present invention is described below with reference to drawings. The drawings are merely exemplary and do not thereby limit the general idea of the present invention.

FIG. 1 shows a coupled unit 1 for carrying out a first embodiment of a method according to the present invention. The coupled unit 1 has three vehicles, namely a tractor 10, a swather 20 attached to the tractor 10, and a round baler 40 attached to the swather 20. The swather 20 forms a first processing device and the round baler 40 forms a second processing device. Both processing devices 20, 40 are pulled by the tractor 10 and are also supplied with energy by the tractor 10. The energy supply can be provided via elements not shown here, for example, electrical lines, hydraulic lines, or cardan shafts, which are coupled directly or indirectly to a PTO stub of the tractor 10.

The tractor 10 has a vehicle body 11 on which wheels are arranged that can be driven at least in part by a drive motor of the tractor 10. The front wheels form a steerable axle 12 of the tractor 10. By adjusting the axle 12, the tractor 10 can be steered by a driver or, if applicable, even by an automatic system. The tractor 10 has a ball head coupling 13, which defines a swather suspension point A, at an end arranged at the rear opposite to the tractor travel direction $F_T$.

Figure 2:
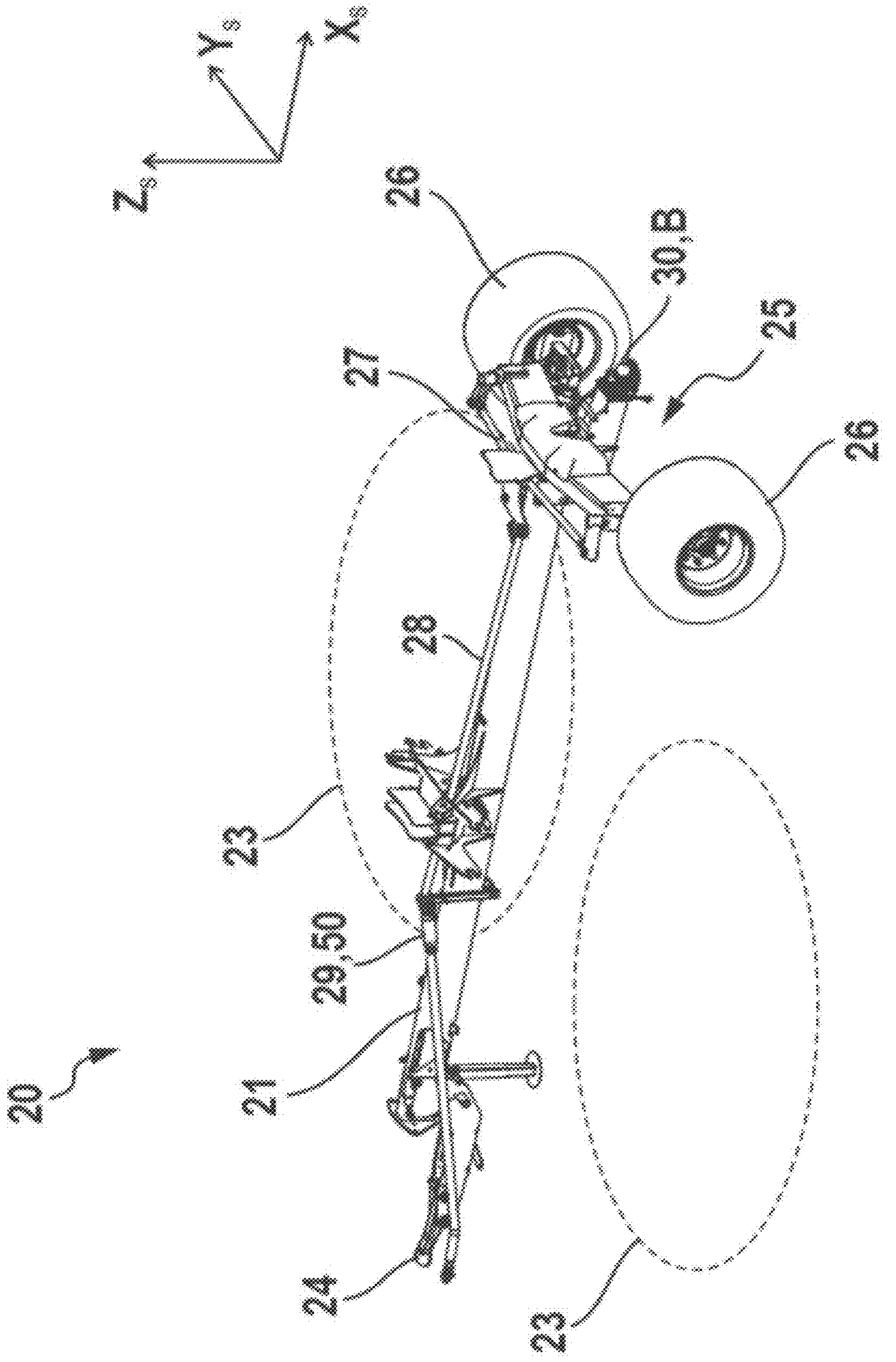
FIG. 2 shows a perspective view of the swather from FIG. 1.
Figure 3:
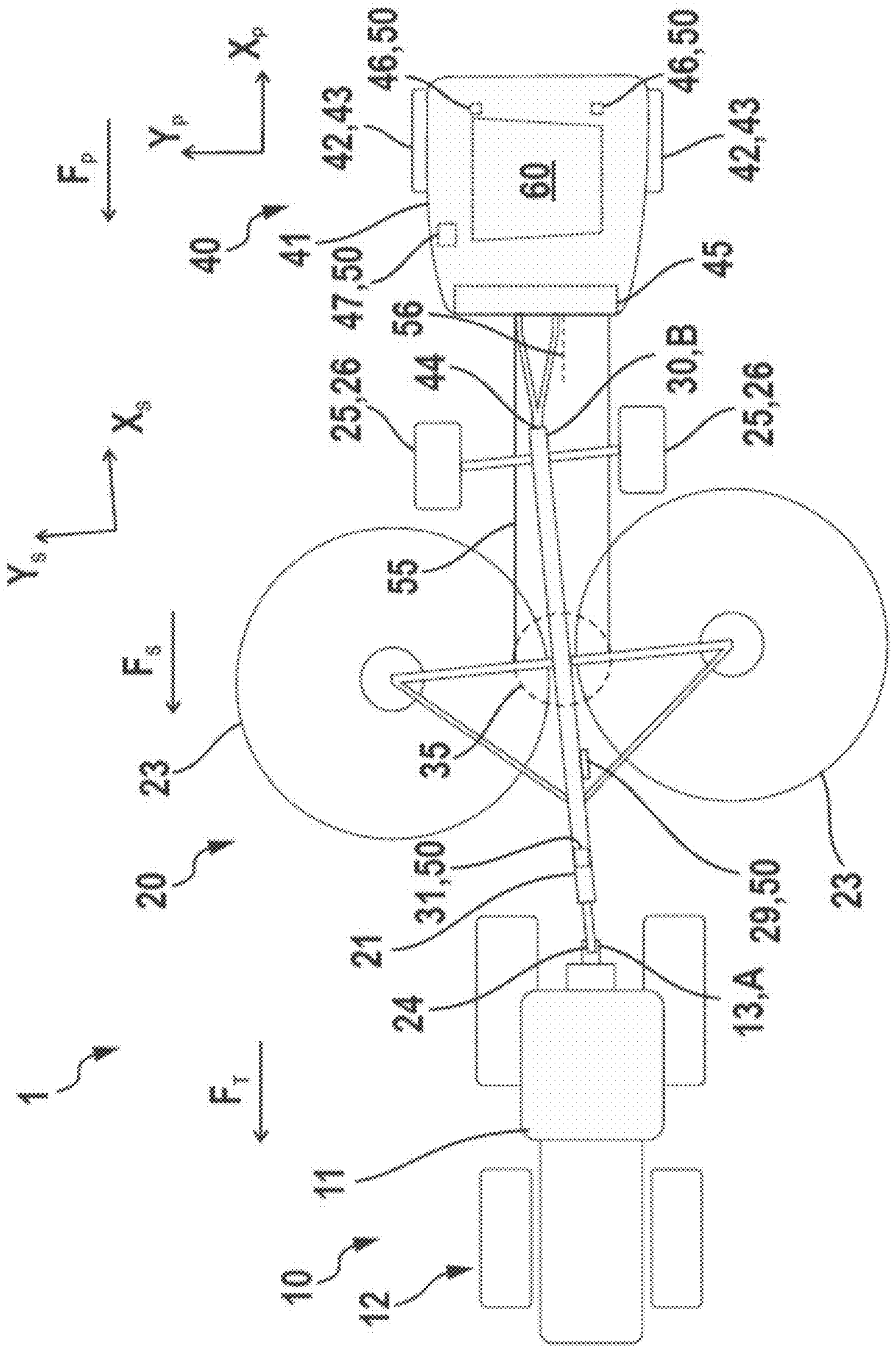
FIG. 3 shows a top view of the coupled unit from FIG. 1 in a second position.

The swather 20 is connected to the ball head coupling 13 via a coupling jaw 24. The coupling jaw 24 is attached to a swather frame 21, which gives the swather 20 structural stability. The swather frame 21 extends along a swather longitudinal axis $X_S$, as can in particular be seen in FIG. 2, in which a swather transverse axis $Y_S$ and a swather vertical axis $Z_S$ are shown in addition to the swather longitudinal axis $X_S$. A steerable axle 25 with two wheels 26 is arranged at an end of the swather frame 21 opposite the coupling jaw 24 in relation to the swather longitudinal axis $X_S$. A raking rotor 23 is arranged along the swather transverse axis $Y_S$ on both sides of the swather frame 21 and can be driven to rotate in a known manner. The design of the raking rotors 23 does not differ in principle from the prior art, which is why they are only indicated schematically in the drawings. During the operation of the coupled unit 1, the raking rotors 23, which form the working elements of the swather 20, pick up crop lying on the ground and deposit it in a deposit area 35, which is partially arranged between the raking rotors 23. The forward movement of the swather 20 thus creates a swath 55, which has a swath center 56 as indicated in FIGS. 1 and 3. As schematically indicated in FIGS. 1 and 2, the swather 20 has a swather control unit 31, which is part of a control device 50 of the coupled unit 1. The swather control unit 31 can control various functions of the swather 20. Among other things, the swather control unit 31 can control a steering actuator 29, which acts on track rods 27 of the axle 25 via a steering rod 28, as can be seen in FIG. 2. This means that the alignment of the wheels 26 can be adjusted by setting the steering actuator 29. A ball head coupling 30 is arranged at the rear of the swather frame 21, which defines a baler suspension point B.

The round baler 40 is attached to the baler suspension point B via a coupling jaw 44, which engages with the ball head coupling 30. The round baler 40 has a baler frame 41 on which wheels 42 of an axle 43 are rotatably mounted. A pick-up device 45, for example, a pick-up, which is shown purely schematically in the drawings, is arranged on the front of the baler frame 41 with respect to a baler longitudinal axis $X_P$. The round baler 40 picks up the swath 55 via the pick-up device 45 and processes it into crop bales 60. The conveying of the crop within the round baler 40 and the pressing into crop bales 60 are not here explained in detail. The latter can be carried out, for example, via a rotating baling belt (not shown). On opposite sides of the crop bale 60 with respect to a baler transverse axis $Y_p$, the diameter of the crop bales 60 can be checked via sensors 46. The sensors 46 shown here schematically can, for example, detect a deflection of the baler belt, however, other measuring methods are also conceivable. The sensors 46 are connected to a baler control unit 47. Like the sensors 46, the baler control unit 47 is part of the control device 50. The baler control unit 47 is connected to the swather control unit 31 in a signal-transmitting manner (not shown here), for example, by a wire in accordance with the ISOBUS standard.

FIG. 1 shows a state in which the crop bale 60 has a significantly smaller diameter on a left-hand side with respect to a baler travel direction $F_P$ than on the opposite right-hand side. This is detected by the baler control unit 47 using the sensors 46. The baler control unit 47 then determines an actuating signal which it sends to the swather control unit 31. The control signal contains information on how the steerable axle 25 is to be set. In this example, the wheels 26 are turned to the right by approximately 5° with respect to the swather travel direction $F_s$. This causes the rear part of the swather frame 21 to move to the right, which changes the alignment of the swather frame 21 with respect to the tractor travel direction $F_T$ (initially unchanged in this example). Finally, the state shown in FIG. 3 is reached, in which the swather longitudinal axis $X_S$ is aligned at an angle of approximately 5° to the tractor direction of travel $F_T$, but the swather travel direction $F_S$ again coincides with the tractor travel direction $F_T$. This means that the swather 20 follows the tractor 10 in crab steering. The steering maneuver also shifted the baler suspension point B relative to the deposit area 35, namely, at an angle to the tractor travel direction $F_T$. Since the round baler 40 is pulled over the baler suspension point B, there is also a displacement of the pick-up device 45 relative to the swath 55. In other words, a pick-up relative position of the swath center 56 relative to the pick-up device 45 with respect to the baler transverse axis $Y_P$ was adjusted. While the swath center 56 in FIG. 1 is picked up centrally by the pick-up device 45, it is clearly shifted to the left in FIG. 3. This results in a proportionately stronger crop feed to the left-hand part of the crop bale 60, which increases the diameter on the left-hand side and tends to achieve a uniform structure.

Figure 4:
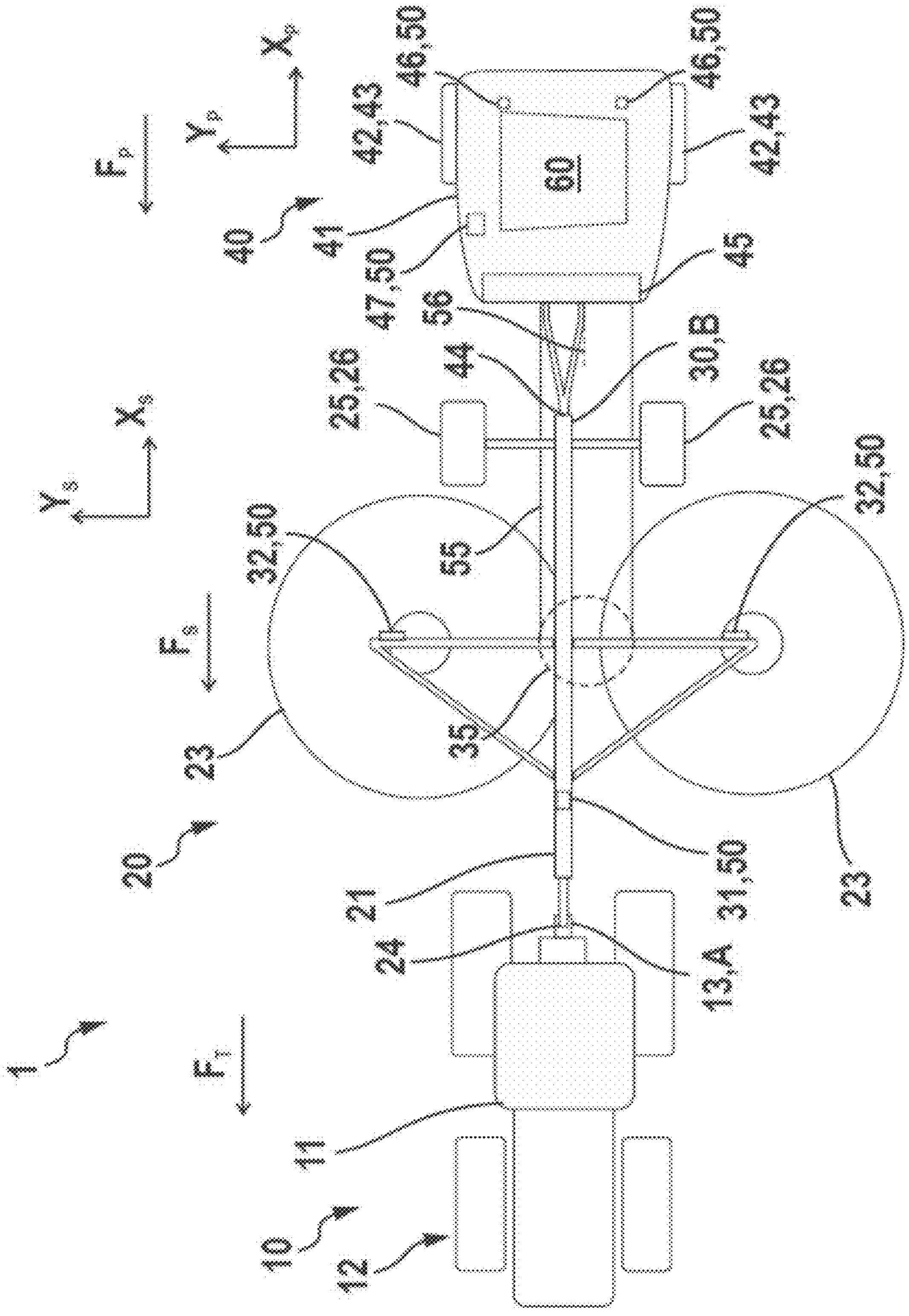
FIG. 4 shows a plan view of a coupled unit for carrying out a second embodiment of the method according to the present invention.

FIG. 4 shows a coupled unit 1 for carrying out a second embodiment of the method according to the present invention. The tractor 10 and the round baler do not differ from the first embodiment. In this case, the axle 25 of the swather 20 is not steerable. Instead, the raking rotors 23 can be displaced along the swather transverse axis $Y_S$ relative to the swather frame 21 via displacement actuators 32. An equilateral displacement of the raking rotors 23 is in particular possible, whereby the deposit area 35 can be displaced in the direction of the swather transverse axis $Y_S$. FIG. 4 shows a state in which (similar to FIG. 1) a smaller diameter of the crop bale 60 on the left-hand side has been detected and the baler control unit 47 has sent an actuating signal to the swather control unit 31. In accordance with the control signal, the swather control unit 31 activated the displacement actuators 32 in order to shift the deposit area 35 to the left. This also results in a displacement of the swath 55, whereby the swath center 56 is displaced towards the left side of the pick-up device 45 with respect to the baler transverse axis $Y_P$.

Figure 5:
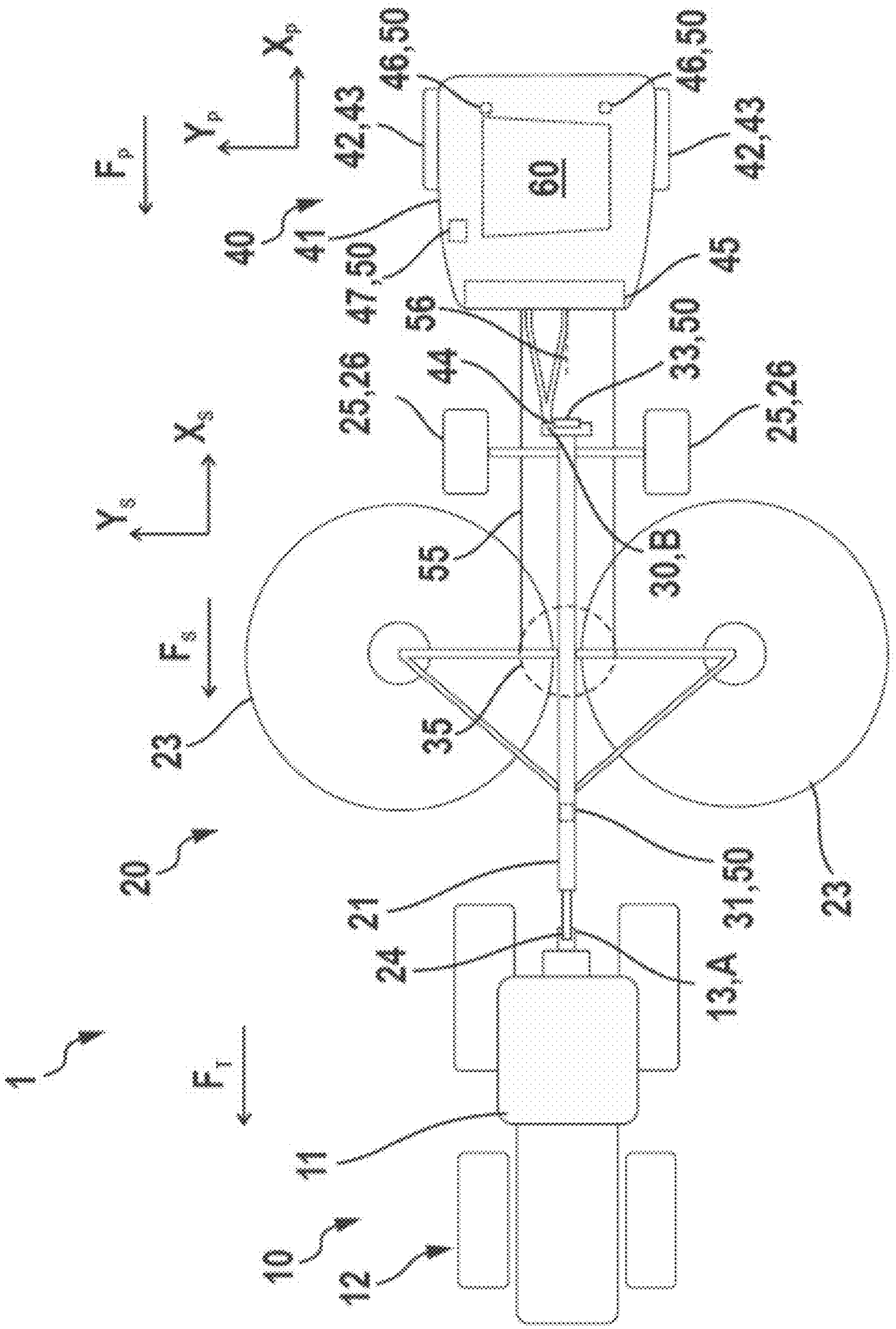
FIG. 5 shows a plan view of a coupled unit for carrying out a third embodiment of the method according to the present invention.

FIG. 5 shows a coupled unit 1 for carrying out a third embodiment of the method according to the present invention, which in turn hardly differs from the coupled units 1 shown in FIGS. 1 and 4. In this case, however, the ball head coupling 30 is not arranged stationary on the swather frame 21, but can be displaced in the direction of the swather transverse axis $Y_S$ via a displacement actuator 33. FIG. 5 again shows a state in which the control device 50 has reacted to a bale diameter on the left-hand side of the crop bale 60 that is too small. The displacement actuator 33 has shifted the ball head coupling 30 to the right, which has also deflected the round baler 40. This again results in the desired displacement of the swath center 56 relative to the pick-up device 45.

Figure 6:
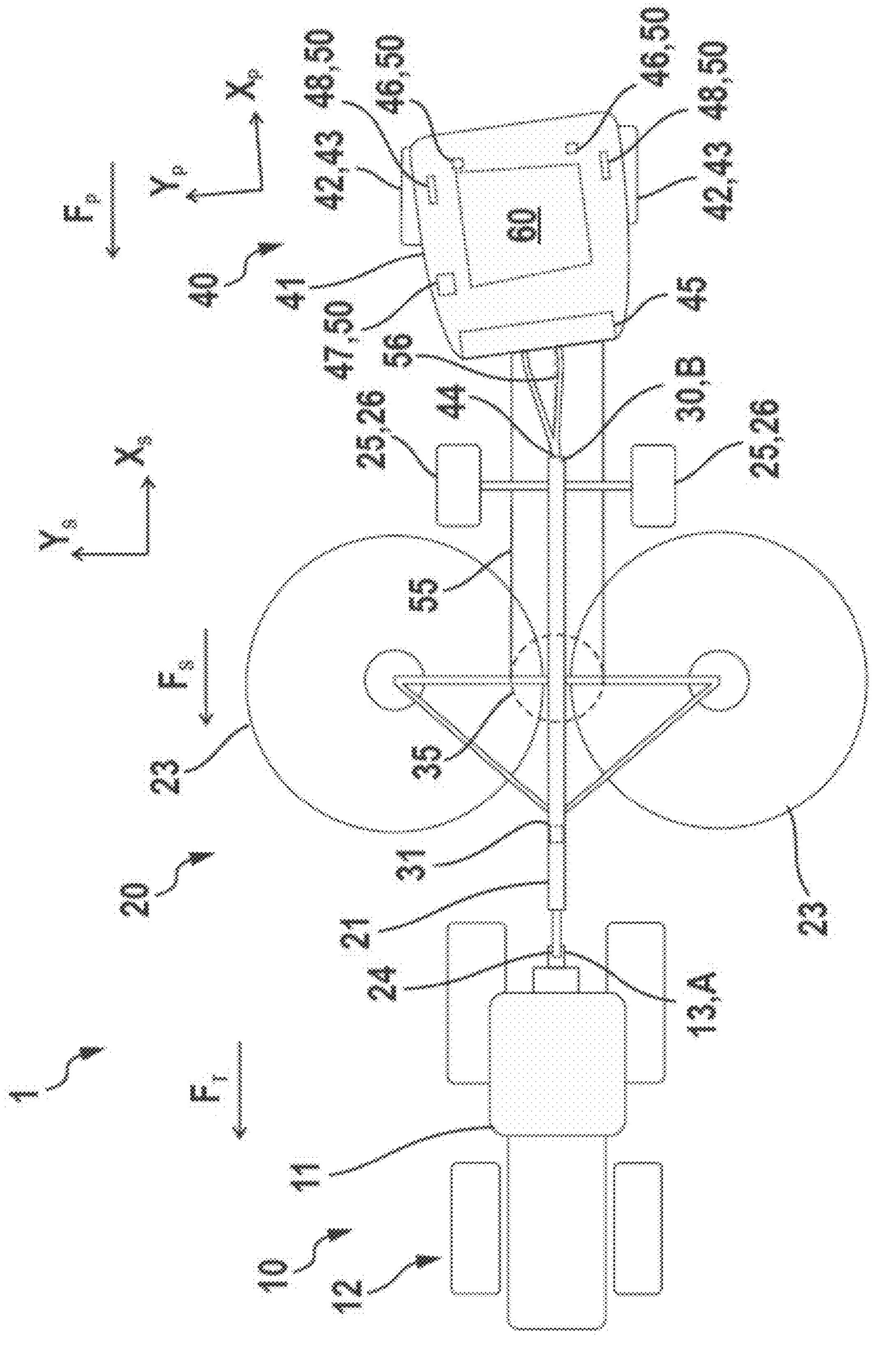
FIG. 6 shows a plan view of a coupled unit for carrying out a fourth embodiment of the method according to the present invention.

FIG. 6 shows a coupled unit 1 for carrying out a fourth embodiment of the method according to the present invention, which also differs little from the coupled units 1 shown in FIGS. 1, 4 and 5. In this case, no components of the control device 50 are assigned to the swather 20. Instead, the axle 43 of the round baler can be steered via steering actuators 48. In FIG. 6, the steering actuators 48 are controlled by the baler control unit 47 so that the round baler 40 is deflected to the right in relation to the swather travel direction $F_s$. It now follows the swather 20 in crab steering, whereby its baler longitudinal axis $X_P$ is not aligned parallel to the direction of baler travel direction $F_P$. This also results in a displacement of the swath center 56 relative to the pick-up device 45.

According to an alternative which is not shown in the drawings, the round baler 40 could have an actuated pivoting drawbar on which the coupling jaw 44 is arranged. By pivoting the drawbar relative to the baler frame 41, the round baler 40 can also be deflected relative to the swather travel direction $F_s$, whereby the baler longitudinal axis $X_P$ remains aligned parallel to the baler travel direction $F_p$, similar to the third embodiment described above.

The present invention is not limited to embodiments described herein; reference should be had to the appended claims.

LIST OF REFERENCE CHARACTERS

1 coupled unit
10 Tractor
11 Vehicle body
12 Axle
13,A Ball head coupling defining swather suspension point A
20 Swather/First processing device
21 Swather frame
23 Raking rotor
24 Coupling jaw
25 Axle
26 Wheel
27 Track rod
28 Steering rod
29 Steering actuator
30,B Ball head coupling defining baler suspension point B
31 Swather control unit
32 Displacement actuator
33 Displacement actuator
35 Deposit area
40 Round baler/Second processing device
41 Baler frame
42 Wheel
43 Axle
44 Coupling jaw
45 Pick-up device
46 Sensor
47 Baler control unit
48 Steering actuator
50 Control device
55 Swath
56 Swath center
60 Crop bail
$F_P$ Baler travel direction
$F_S$ Swather travel direction
$F_T$ Tractor travel direction
$X_P$ Baler longitudinal axis
$X_S$ Swather longitudinal axis
$Y_P$ Baler traverse axis
$Y_S$ Swather transverse axis
$Z_S$ Vertical axis

The invention claimed is:

1. A method for operating a coupled unit with a tractor, a swather attached to the tractor as a first processing device, and a round baler attached to the swather as a second processing device, the method comprising:
- using the swather to pick up a crop lying on the ground via processing elements which are arranged on a swather frame;
- using the swather to deposit the picked-up crop in a deposit area so as to form a swath which has a swath center;
- using the round baler to pick up the swath via a pick-up device which extends along a round baler transverse axis;
- using the round baler to further compress the picked-up swath into at least one crop bale; and
- performing an automatic pick-up adjustment via a device adjustment on at least one of the swather and on the round baler via an actuator-based device setting, at which automatic pick-up adjustment a relative picking up position taken at the swath center and at the pick-up device relative to one another with respect to the round baler transverse axis is adjusted so as to achieve a uniform build-up of the at least one crop bale along the round baler transverse axis, wherein,
- the round baler sends an adjustment signal to the swather,
- the swather performs the device adjustment based on the adjustment signal, and
- the tractor, the swather attached to the tractor as the first processing device, and the round baler attached to the swather as the second processing device are provided as three separate vehicles.

2. The method as recited in claim 1, wherein,
- the swather is a rotary rake comprising at least two raking rotors, and
- the at least two raking rotors are configured to pick up the crop and to deposit the crop in the deposit area which is arranged at least partially between the at least two raking rotors.

3. The method as recited in claim 1, wherein,
- the round baler comprises sensors arranged therein which are configured to detect a current shape of the at least one crop bale, and
- the device adjustment is performed as a function of the current shape detected.

4. The method as recited in claim 1, wherein the device adjustment is performed on the swather.

5. The method as recited in claim 4, wherein,
- the swather comprises at least one steerable axle,
- the device adjustment is made to the at least one steerable axle of the swather, and
- the device adjustment thereby influences an alignment of the swather frame relative to a tractor travel direction of the tractor so as to adjust the relative picking up position.

6. The method as recited in claim 4, wherein the device adjustment actuatorically adjusts an arrangement of the processing elements of the swather relative to the swather frame so as to displace the deposit area.

7. The method as recited in claim 6, wherein the device adjustment at least temporarily displaces the deposit area at an angle to a tractor travel direction of the tractor.

8. The method as recited in claim 1, wherein the device adjustment is performed on the round baler.

9. The method as recited in claim 8, wherein,
the round baler comprises at least one steerable axle, and
the device adjustment performed on the round baler deflects the at least one steerable axle of the round baler.

10. The method as recited in claim 8, wherein,
the round baler is connected to the swather via a baler suspension point, and
the device adjustment at least temporarily displaces the baler suspension point relative to the deposit area at an angle to a tractor travel direction of the tractor.

11. The method as recited in claim 10, wherein the device adjustment actuatorically adjusts a position of the baler suspension point relative to the swather frame so as to deflect the round baler.

12. The method as recited in claim 8, wherein the device adjustment at least temporarily deflects the round baler at an angle to a swather travel direction of the swather.

13. A control device for a coupled unit having a tractor, a swather attached to the tractor as a first processing device, and a round baler attached to the swather as a second processing device,
wherein,
the swather is provided for picking up a crop lying on the ground via processing elements which are arranged on a swather frame and depositing the crop in a deposit area so as to form a swath having a swath center,
the round baler is provided for picking up the swath with a pick-up device which extends along a round baler transverse axis and further pressing the swath into at least one crop bale,
the control device is configured to perform an automatic pick-up adjustment via a device adjustment on at least one of the swather and on the round baler via an actuator-based device setting, at which automatic pick-up adjustment a relative picking up position taken at the swath center and at the pick-up device relative to one another with respect to the round baler traverse axis is adjusted so as to achieve a uniform build-up of the at least one crop bale along the round baler traverse axis,
the round baler sends an adjustment signal to the swather,
the swather performs the device adjustment based on the adjustment signal, and
the tractor, the swather attached to the tractor as the first processing device, and the round baler attached to the swather as the second processing device are provided as three separate vehicles.

* * * * *